(12) United States Patent
Szweda

(10) Patent No.: US 11,699,925 B2
(45) Date of Patent: Jul. 11, 2023

(54) ARTIFICIAL TREES WITH WIRELESS POWER TRANSMISSION

(71) Applicant: Belgravia Wood Limited, Hong Kong (HK)

(72) Inventor: Eric Szweda, Hong Kong (HK)

(73) Assignee: Belgravia Wood Limited, Hong Kong (CN)

(*) Notice: Subject to any disclaimer, the term of this patent is extended or adjusted under 35 U.S.C. 154(b) by 0 days.

(21) Appl. No.: 17/304,103

(22) Filed: Jun. 14, 2021

(65) Prior Publication Data
US 2022/0399757 A1    Dec. 15, 2022

(51) Int. Cl.
| | |
|---|---|
| H02J 50/40 | (2016.01) |
| H02J 50/10 | (2016.01) |
| A47G 33/06 | (2006.01) |
| F21V 23/00 | (2015.01) |
| F21V 23/04 | (2006.01) |
| H02J 7/02 | (2016.01) |
| F21Y 115/10 | (2016.01) |
| F21W 121/04 | (2006.01) |

(52) U.S. Cl.
CPC ............. *H02J 50/40* (2016.02); *A47G 33/06* (2013.01); *F21V 23/009* (2013.01); *F21V 23/0435* (2013.01); *H02J 7/02* (2013.01); *H02J 50/10* (2016.02); *F21W 2121/04* (2013.01); *F21Y 2115/10* (2016.08)

(58) Field of Classification Search
CPC .... H02J 50/40; H02J 50/10; H02J 7/02; H02J 50/00; A47G 33/06; A47G 33/08; A47G 2033/0827; F21V 23/009; F21V 23/0435; F21Y 2115/10; F21W 2121/04; F21S 4/10
See application file for complete search history.

(56) References Cited

U.S. PATENT DOCUMENTS

| | | | | |
|---|---|---|---|---|
| 5,034,658 | A * | 7/1991 | Hierig | A47G 33/08 |
| | | | | 362/810 |
| 5,118,196 | A * | 6/1992 | Ault | H01J 65/042 |
| | | | | 315/76 |
| 2015/0333533 | A1* | 11/2015 | Higgins | F21V 23/026 |
| | | | | 307/104 |
| 2016/0330823 | A1* | 11/2016 | Hwa | H05B 47/19 |

* cited by examiner

*Primary Examiner* — Bao Q Truong
(74) *Attorney, Agent, or Firm* — Finnegan, Henderson, Farabow, Garrett & Dunner LLP

(57) ABSTRACT

The present disclosure provides an artificial tree. The artificial tree includes a trunk including one or more trunk sections. The one or more trunk sections include a first trunk section including a first transmitter connected to a power source and configured to convert an input power received from the power source into an electromagnetic field, and a first receiver arranged proximate the first transmitter and configured to receive the electromagnetic field generated by the first transmitter and generate a first output current.

21 Claims, 8 Drawing Sheets

ARTIFICIAL TREES WITH WIRELESS POWER TRANSMISSION

TECHNICAL FIELD

The present disclosure relates to powered artificial decorative trees, such as artificial Christmas trees.

BACKGROUND

Decorative artificial trees are growing in popularity and in turn the types, styles and uses of these trees are multiplying. Usually made to resemble various types of fir or palm trees, or trees without foliage, artificial trees are often decorated and displayed indoors or outdoors to celebrate special occasions, or otherwise displayed to create ambiance.

Among the trends in artificial trees over the past couple of decades has been the development of controllable lighting systems, which systems require the transmission of energy and data.

Conventional methods disclosed for providing wireless energy to the decorations on a tree is a transmitter unit placed at or near the base of a tree, which unit transmits waves up and thru the tree branches, to reach receiver units located on branches. This method comes with disadvantages.

SUMMARY

Embodiments of the present disclosure provide an artificial tree. In some embodiments, the artificial tree includes a trunk including one or more trunk sections. The trunk or more sections include: a first trunk section. The first trunk section includes a first transmitter connected to a power source and configured to convert an input power received from the power source into an electromagnetic field; and a first receiver arranged above the first transmitter and configured to receive the electromagnetic field generated by the first transmitter and generate a first output current accordingly.

It is to be understood that both the foregoing general description and the following detailed description are exemplary and explanatory only and are not restrictive of the disclosed embodiments.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
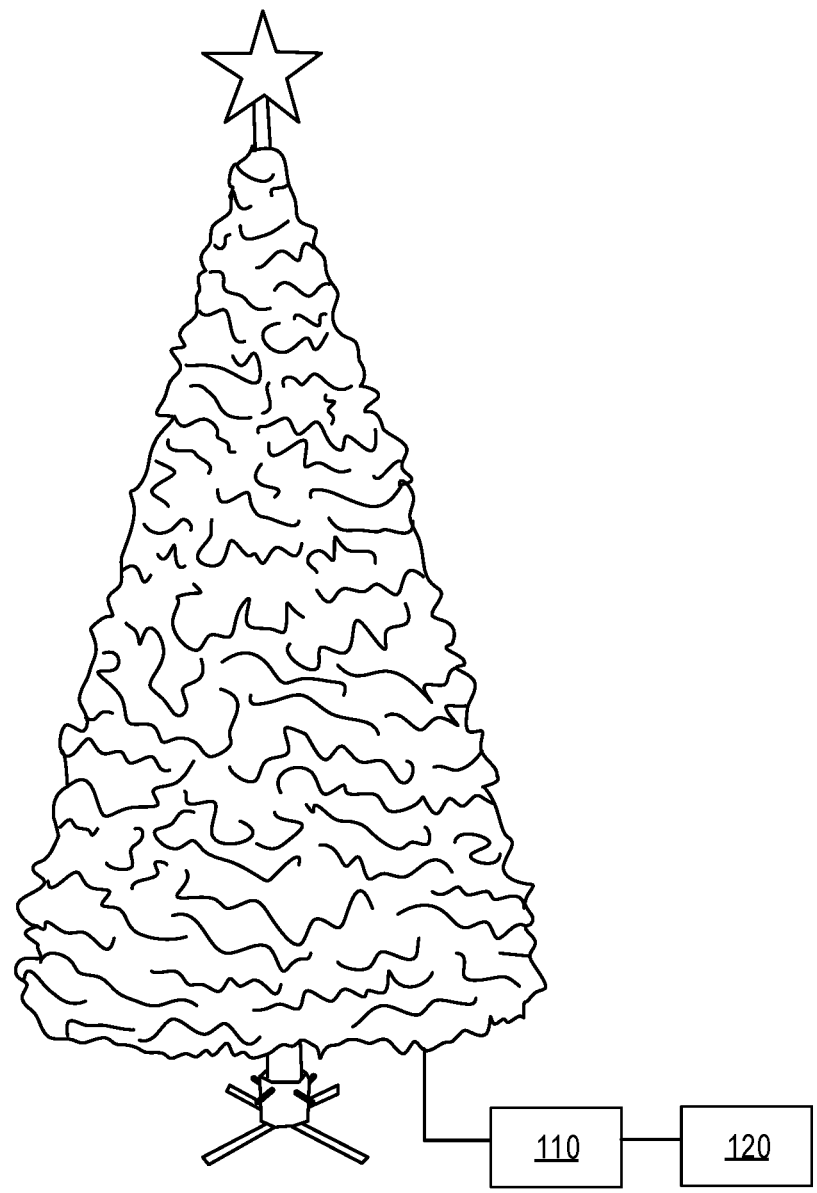
FIG. 1 is a diagram illustrating an assembled artificial tree with releasably connected components according to some embodiments of the present disclosure.

The following disclosure provides many different exemplary embodiments, or examples, for implementing different features of the provided subject matter. Specific simplified examples of components and arrangements are described below to explain the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In this document, the term "coupled" may also be termed as "electrically coupled", and the term "connected" may be termed as "electrically connected". "Coupled" and "connected" may also be used to indicate that two or more elements cooperate or interact with each other.

Examples of the present disclosure relate to decorative artificial trees, such as Christmas trees, palm trees, Valentine trees, Easter trees, Halloween trees and the like. Although preferred examples of the disclosed technology are explained in detail, it is to be understood that other examples are contemplated. Accordingly, it is not intended that the disclosed technology is limited in its scope to the details of construction and arrangement of components set forth in the following description or illustrated in the drawings. The disclosed technology is capable of other examples and of being practiced or carried out in various ways. Also, in describing the preferred examples, specific terminology will be resorted to for the sake of clarity. It is intended that each term contemplates its broadest meaning as understood by those skilled in the art and includes all technical equivalents which operate in a similar manner to accomplish a similar purpose.

Wireless transmission of energy can be used to provide power for the lights on the branches and provide for other actions, such as enabling motion of objects on the tree or branches of the tree, or for levitation of objects, such as tree toppers. This can be accomplished by near field or non-radiative wireless transmission, which enables power to be transferred over short distances by magnetic fields using inductive coupling between coils of wire, or by electric fields using capacitive coupling between metal electrodes.

The present disclosure relates to a system for wirelessly transmitting energy to be used to operate or decorate an artificial tree. Among the benefits of a wireless system for transmitting energy is the elimination of physical copper and plastic wiring. The elimination of copper and plastic wiring reduces costs due to the savings earned by reducing these materials and reducing the cost of labor need to make an artificial tree. The elimination or reduction in wiring also improves the look of the artificial tree by reducing unsightly wires. The elimination of wiring also makes set-up, use, and disassembly easier for the consumer. The elimination of copper and plastic wiring also reduces weight and ultimately, reduces waste. The elimination of copper and plastic wiring also reduces the potential for operational deficiencies associated with wired connections, including the deterioration of the wires over time or the wires being compromised by mechanical interference.

The present disclosure identifies providing wireless energy to power lights, or create motion, or otherwise provide power to cause other actions in, or on, or near a decorative object like at tree, such as but not limited to levitation of objects enjoyed with or part of the decoration or use of an artificial tree. In one embodiment, the tree uses the inside of a hollow pole or trunk to house a single transmitter or multiple transmitters and a single receiver or multiple receivers and additionally in another embodiment, a single or multiple repeaters, to transmit or transfer and receive wireless energy thru the pole or trunk.

In another embodiment, the source of the wireless energy may not be a transmitter unit that comes with or is otherwise part of the tree apparatus, but a source external and apart from the tree, such as a separate system able to transmit energy that can be received by various devices or appliances created to receive and use such transmitted power in or throughout a room or other area.

Reference is made to FIG. 1, which illustrates an artificial tree 100 in communication with a wireless power receiving unit 110 is provided in proximity to the artificial tree 100. The wireless power receiving unit 100 can be a device capable of receiving power wirelessly from wireless power transmitting unit (not shown) that can be provided along with the artificial tree 100 or be separate from the artificial tree 100 and provide power to multiple devices. As illustrated in FIG. 1, the wireless power receiving unit 110 can be configured with a wired connection to the tree; thus, the wireless power receiving unit 110 can receive power via a wireless power transmission and provide primary or supplemental power to the artificial tree 100, including decorative lighting, ornaments, tree toppers, projectors, motion controls, and lighting systems on the artificial tree 100. In other embodiments, the wireless power receiving unit 110 can be configured with a wireless connection to the tree.

In some embodiments, the power storing unit 120 illustrated in FIG. 1 can be used to store and retain energy obtained by the wireless power receiving unit 110 and to provide energy to the artificial tree 100 for lights, decorations, ornaments, tree toppers, projectors, and other powered components. The power storing unit 120 can be battery, capacitive device, or other device capable or storing charge and or power. In some embodiments, the power storing unit 120 can provide power at different wattage, amperage, or voltage than the wattage, amperage, or voltage at which the power is received by the wireless power receiving unit 110. In some embodiments, the wireless power receiving unit 110 could receive power at a relatively low wattage, provide the energy to the power storing unit 120 for storage, and the power storing unit 120 could provide power at relatively high wattage. Accordingly, the wireless power receiving unit 110 could provide a charge to the power storing unit 120 at relatively low rate, such as a trickle charge, and store that energy for consumption at a higher rate by the artificial tree 100. In a non-limiting example, the wireless power receiving unit 110 could receive power at a relatively low wattage and provide that energy to the power storing unit 120 for storage over a 24-hour period, and the power storing unit 120 could provide a relatively high wattage of power output to the artificial tree 100 for a much shorter time period, such as one or two hours. In this embodiment, the lighting system of the artificial tree 100 may only be illuminated for a few hours of the day, but the power storing unit 120 is continually storing power received by the wireless power receiving unit 110. For this embodiment, the electromagnetic radiation or equivalent wireless energy transmission rate in the area adjacent to the artificial tree 100 could be kept advantageously low while enabling the provision of power to the artificial tree 100 at a substantially higher rate. Thus, the configuration of the wireless power receiving unit 110 in communication with the power storing unit 120 is beneficial.

Figure 2A:
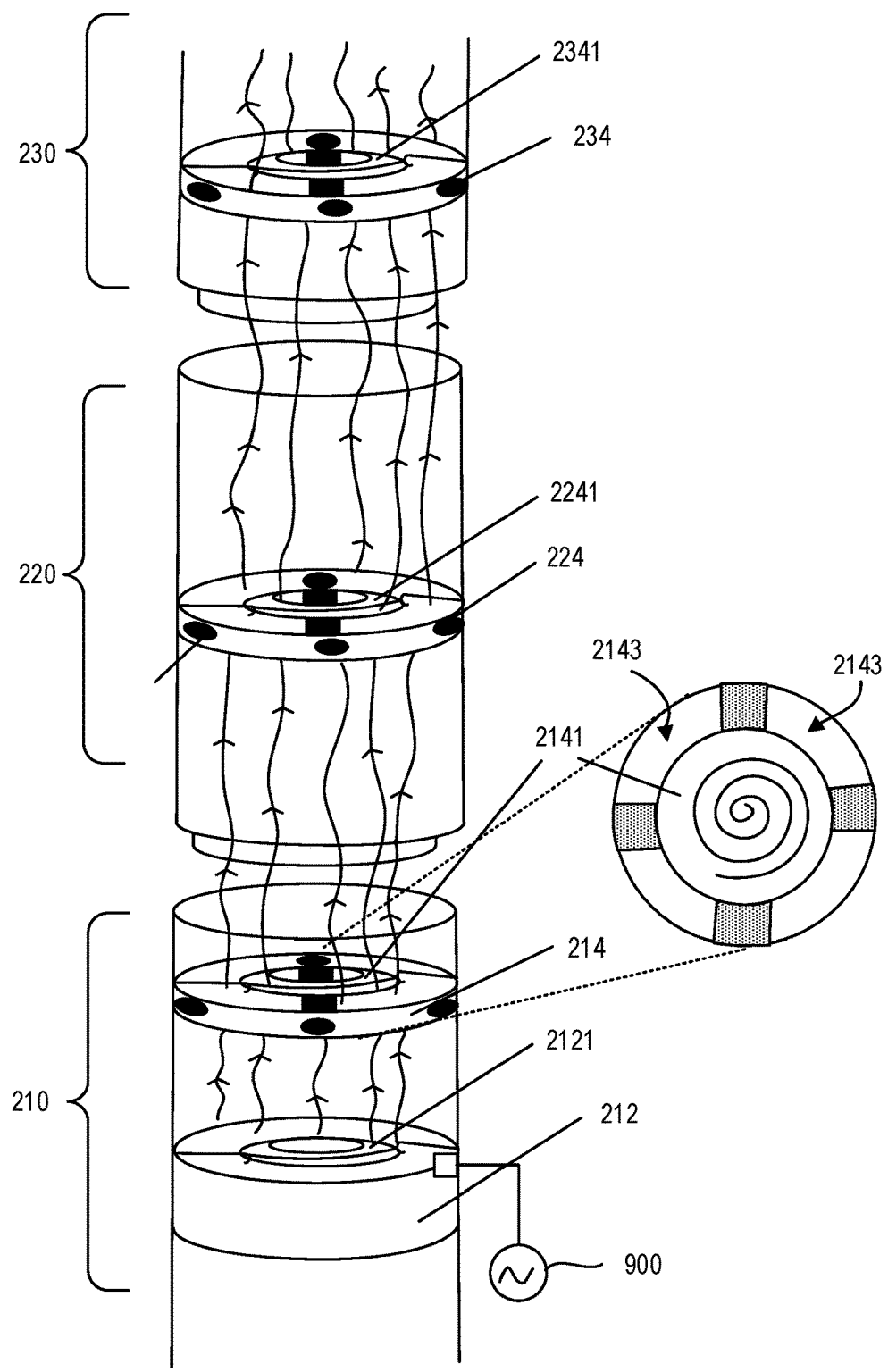
FIG. 2A is a diagram illustrating a trunk portion of the artificial tree according to some embodiments of the present disclosure.

Reference is made to FIG. 2A, which is a diagram illustrating a trunk portion 200 of the artificial tree 100 according to some embodiments of the present disclosure. As shown in FIG. 2A, the trunk portion 200 includes multiple trunk sections 210, 220, and 230, which can be assembled to collectively form the trunk portion 200.

In some embodiments, a power transmission unit can be connected to the trunk portion 200 or base (or separately situated in or around the tree) and can utilize the electricity from an external power source 900 to generate a beam of electromagnetic radiation or equivalent wireless energy. This beam can take the form of visible light, microwave radiation, near infrared radiation or any appropriate frequency or frequencies, depending on the technology chosen for a particular embodiment. The interchangeable component assemblies can include a power reception unit receives power from one or several power transmitters, and converts the total power received to electricity. Similar to the focusing of the transmitted power, it is possible to concentrate the received power for conversion, using receiving arrays, antennas, reflectors or similar means. The power reception unit technology can be a rectenna, a photovoltaic cell, nanotechnology antennas or any other technology capable of converting electromagnetic radiation to electricity, or any combination of the above.

As shown in the embodiments in FIG. 2A, a transmitter 212 is arranged and located in the lower trunk section 210. Particularly, in some embodiments, the transmitter 212 can be connected, via an electrical wire, to the external power source 900. The power source 900 is an available main power supply, which may be a power grid, a solar power system, a battery system, or the like. For example, the transmitter 212 may be connected to the power grid via an electric cord and a wall power socket. In other embodiments, the external power source 900 is a solar power or ambient light or energy harvester system, or other sustainable energy source (e.g., a wind power system), independent of any power grid and used solely to provide power to transmitter 212.

The transmitter 212 is configured to convert the electrical power received from the power source 900 into an electromagnetic field by use of the wireless power transmission unit, such as a coil. In some embodiments, the transmitter 212 may include one or more antenna units to transmit power and/or data. For example, the transmitter 212 may have one or more wireless power transmission units 2121, such as transmitting coils. In addition, the lower trunk section 210 may also include a receiver 214, which is arranged and located in the lower trunk section 210 and above the transmitter 212. In some embodiments, multiple receivers 214, 224, and 234 can be separately arranged in different trunk sections 210, 220, and 230 of the trunk portion 200. Receivers 214, 224, and 234 are configured to receive the electromagnetic field generated by the transmitter 212, and then generate corresponding electrical currents accordingly. Thus, the receivers 214, 224, and 234 can provide the generated currents to one or more loads connected to the receivers 214, 224, and 234, such as LED lights, ornaments, or tree toppers, such as stars or angels.

As shown in FIG. 2A, in some embodiments, each trunk section may include one receiver, but the present disclosure is not limited thereto. In addition, in some embodiments, receivers 214, 224, and 234 may include one or more openings, passageways, or channels 2143, which ensures sufficient open passages in the trunk portion such that the electromagnetic field can reach the last or the final receiver at the top trunk section of the trunk portion 200 and allows a greater wireless power transmission efficiency. In various applications, the power consumption required by decorative lights and/or IC components for other lights has be reduced significantly. Therefore, the power level transferred wirelessly, over moderate distances, inside the pole may be within a lower power range, from few watts to several watts.

In some embodiments, the wireless power transmission units are transmitting coil(s) in the transmitter 212 and receiving coils 2141, 2241, 2341 in the receivers 214, 224, and 234, which may be implemented by flat spiral coils formed by wound copper wires. In some embodiments, the transmitter 212 and the receivers 214, 224, and 234 may also communicate through inductive coupling via induced magnetic fields between transmitting and receiving coils (loop antennas). Particularly, an alternating current (AC) through the transmitter coil in the transmitter 212 may create an oscillating magnetic field, which first passes through the receiving coil in the receiver 214, and then the oscillating magnetic field further passes through the receiving coil in the receivers 224 and 234 respectively. Accordingly, alternating voltages are induced in the receiving coils, which generate alternating currents in the receivers 214, 224, and 234. In some embodiments, the induced alternating currents may drive corresponding loads electrically connected to trunk sections 210, 220, and 230 directly. In some other embodiments, the induced alternating currents can be rectified by a rectifier in the receivers 214, 224, and 234 to direct current (DC) to drive the loads.

For example, the wireless power transmission can be used to provide power for the LED lights on the branches of the artificial tree, without having to use physical couplers between the wiring in or along the tree trunk (or pole) and the branches of the artificial tree. As shown in FIG. 1, each of the receivers 214, 224, and 234 may include one or multiple output connectors. The output connectors are configured to be connected to the loads at the branches and enable transmission of the power to the loads located at the branches. In some embodiments, the trunk sections 210, 220, and 230 are drilled to create holes for mounting these output connectors. Accordingly, in some embodiments, the branches provide wired LED lights but the trunk portions are connected wirelessly. In other embodiments, all connections are wireless.

As an example, a trunk section can include a plurality of releasably connected pre-lit branch assemblies configured to be mechanically attachable and detachable to a trunk body of the trunk section and electrically attachable and detachable to the main power source of the tree (e.g., power source, non-radiating wireless energy field, etc.).

As a further example, a trunk section can include one or more releasably connected wiring harnesses configured to electrically connect the lighting elements of a releasably connected pre-lit branch assembly to the main power within or along a trunk section. As will be appreciated, such wiring harnesses allow for ease of connection and disconnection while also providing flexibility for the overall tree assembly. For example, wiring harnesses can be designed to allow for various types of power (e.g., low voltage systems for powering LEDs or small electronics, medium voltage systems for providing power for a large array of LEDs or small electronics, high voltage systems originating from a wall outlet, etc.) and lighting configuration (e.g., series wired lighting elements, parallel wired lighting elements, series wired light strings, parallel wired light strings, parallel series wired light strings, series parallel wired light strings, etc.). Such design flexibility benefits both the consumers as they have the ability to easily maintain and customize their tree, but also to the manufacturers as their ability to manufacture a batch of releasably connected components can lead to vast array of easily assembled artificial trees. Additionally, electrical connection can carry power, data, or both. For example, an electrical connection can facilitate the powering lights on a pre-lit branch assembly. An electrical connection can facilitate the transmission of a control signal operable to, for example, change lighting settings of pre-lit branch assemblies.

In some embodiments, the mechanical connection of the tree poles can be achieved by a plastic mechanical connection. As shown in FIG. 2A, each of the trunk sections 210, 220, and 230 can be configured to set into another trunk section via a base part with a sprocket structure or a clutch structure. The sprocket structure or the clutch structure is provided for preventing the rotation after two corresponding trunk sections are assembled.

Figure 2B:
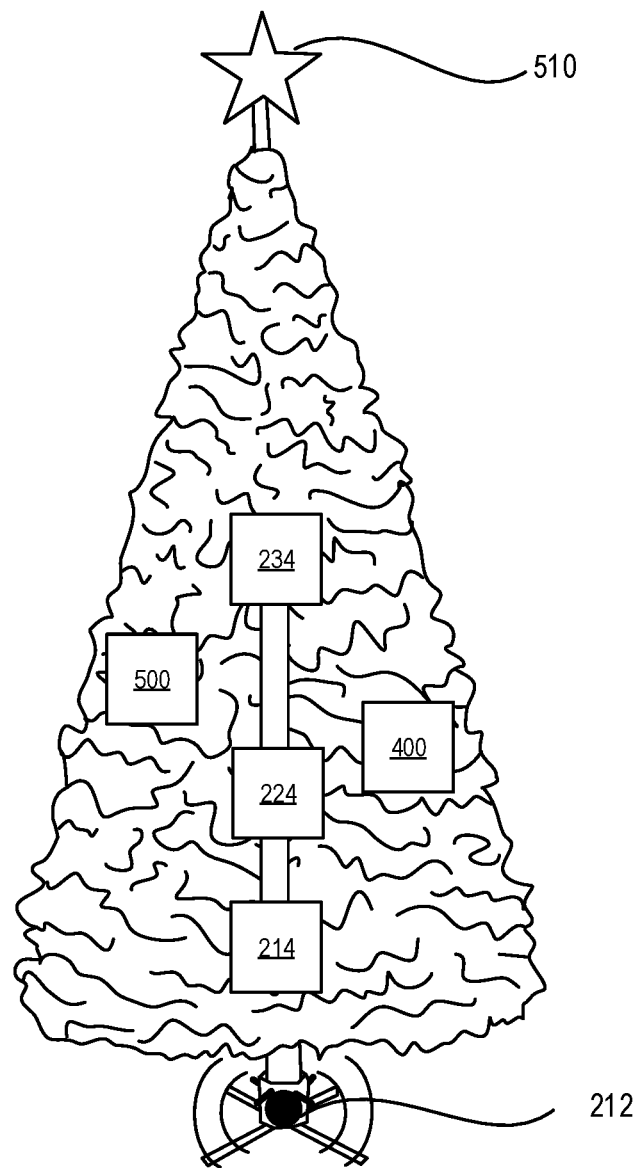
FIG. 2B is a diagram illustrating the wireless power/data transmission within the artificial tree, according to some embodiments of the present disclosure.

Reference is made to FIG. 2B, which is a diagram illustrating the wireless power/data transmission within the artificial tree 100, according to some embodiments of the present disclosure. As discussed above, the transmitter 212 connected to the pole or base of the artificial tree 100, or separately situated in or around the tree, can utilize electromagnetic radiation. Use of wireless transmission reduces the connections and wirings needed to transmit electrical signals (such as power or data) throughout the artificial tree 100. In some embodiments, the transmission can be visible light, microwave radiation, near infrared radiation or any appropriate frequency or frequencies, depending on the technology chosen. For example, wireless transmission of energy can be used to provide power for the lights on the branches without having to use connectors between wiring in or along the pole or tree trunk and the branches.

As depicted in FIG. 2B, the lower trunk section 210 includes the wireless transmitter 212. The wireless transmitter 212 is operable to transmit power or data signals to a plurality of receivers 214, 224, and 234. In some embodiments, the wireless transmitter 212 does not transmit power and only transmits data; thus, the plurality of receivers 214, 224, and 234 are only used to receive data. As discussed above, in other embodiments the wireless transmitter 212 transmits both power and data. In those embodiments, some receivers only receive data, others only receive power, and others receive power and data. Those of skill in the art will appreciate that the data transmitted can be used to communicate with or control various devices on the artificial tree 100, such as decorative lighting, ornaments, tree toppers, projectors, motion controls, and lighting systems. The receivers 214, 224, and 234 can be part of the trunk section 210, 220, and 230, or part of the plurality of releasably connected pre-lit branch assemblies, power distribution hubs, other portions of the artificial tree 100, or any combination thereof. Similar to the focusing of the transmitted power, it is possible for the plurality of receivers to concentrate the received power for conversion, using receiving arrays, antennas, reflectors or similar means. Additionally, or alternatively, a power distribution hub may include a wireless transmitter, receiver, transceiver, or a combination thereof. As will be appreciated, any one or more of the trunk sections 210, 220, and 230 and the branch portion 400, may include transmitters, receivers, or transceivers, to transmit or receive signals controlling or powering the brightness or effect of the components (e.g., LED lights) installed in the branch portion 400 or the ornament(s) 500. In some embodiments, a star tree topper 510 of the artificial tree 100 in FIG. 2B may also be a wireless ornament capable of being powered wirelessly.

Figure 2C:
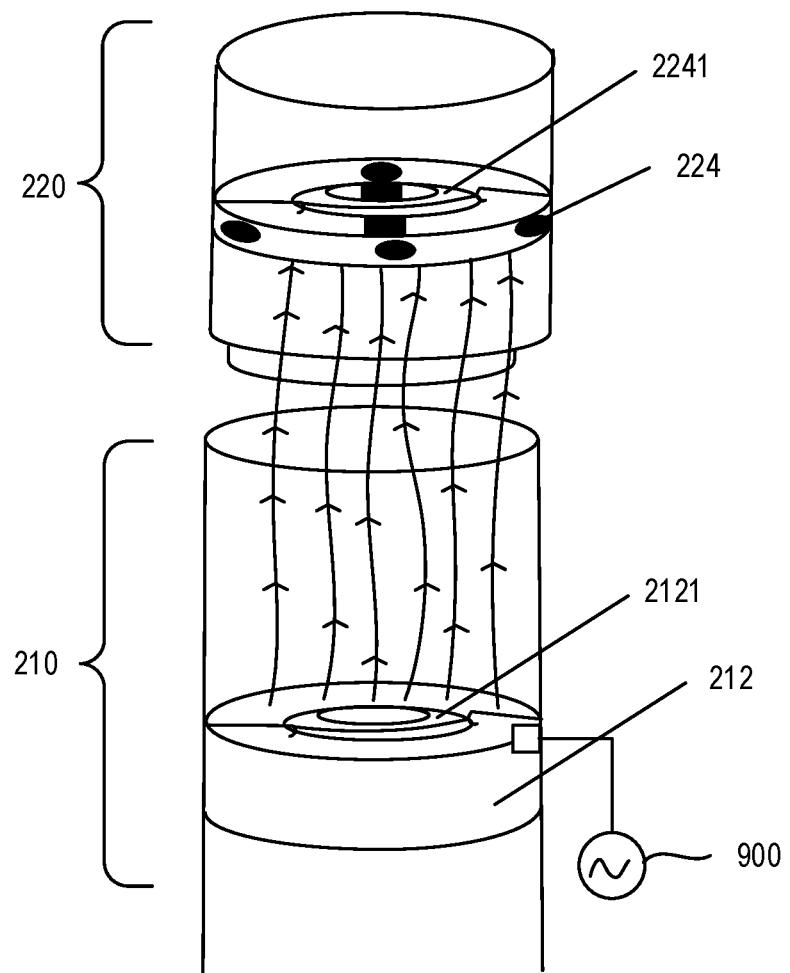
FIG. 2C is a diagram illustrating another trunk portion of an artificial tree according to some embodiments of the present disclosure.

Reference is made to FIG. 2C, which is a diagram illustrating another trunk portion 200 of an artificial tree according to some other embodiments of the present disclosure. As shown in FIG. 2C, in some embodiments, the trunk section 210 includes one transmitter 212, and the trunk section 220 includes one receiver 224. Accordingly, the transmitter 212 can receive power from the external power source 900 and transmit the power wirelessly to the receiver 224 in the next trunk section 220. Structures and operations of the transmitter 212 and the receiver 224 have been discussed in detail above and thus are not repeated herein for the sake of brevity.

Figure 3A:
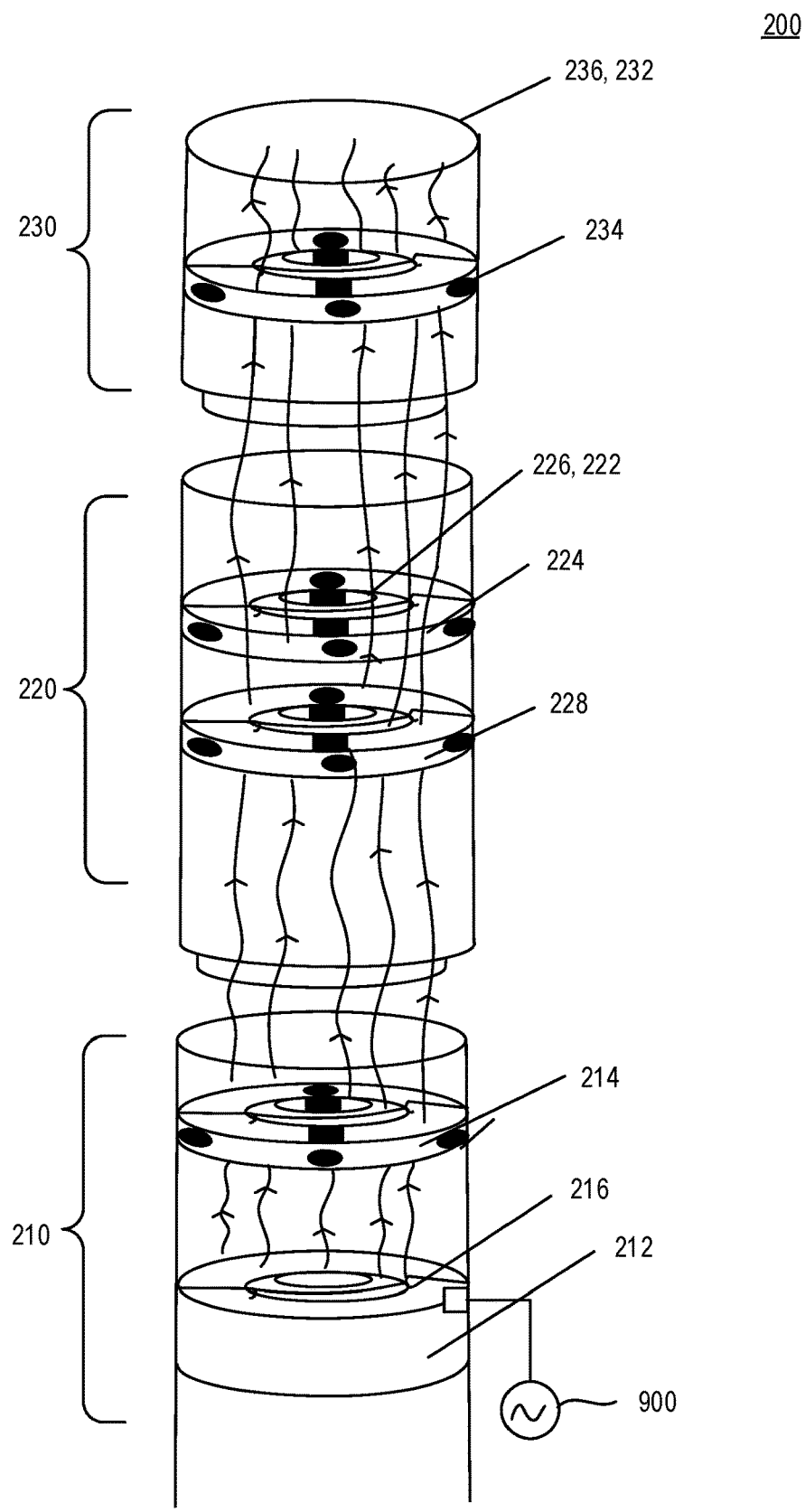
FIG. 3A is a diagram illustrating another trunk portion of an artificial tree according to some embodiments of the present disclosure.

Reference is made to FIG. 3A, which is a diagram illustrating another trunk portion 200 of an artificial tree according to some embodiments of the present disclosure. As shown in FIG. 3A, in some embodiments, each of the trunk sections 210, 220, and 230 may include at least one transmitter (e.g., transmitters 212, 222, and 232), and at least one receiver (e.g., receivers 214, 224, and 234). In addition, in some embodiments, each of the trunk sections 210, 220, and 230 may further include battery components 216, 226 and 236 respectively coupled to the receivers 214, 224, and 234 and configured to be charged using the power outputted from the receivers 214, 224, and 234. Accordingly, transmitters 222, and 232 can respectively receive power from the battery components 226 and 236, and further transmit the power wirelessly to the next trunk section. Furthermore, in some embodiments, each of the trunk sections 210, 220, and 230 may include one or more intermediate resonators 228 (repeaters) placed between corresponding transmitter(s) and receiver(s). The repeaters 228 arranged within the trunk sections 210, 220, and 230 are configured to enhance the transfer distance of the wireless power.

As shown in FIG. 2A and FIG. 3A, in some embodiments, transmitting and receiving coils may be disposed at a center (or core) part of the trunk sections, with openings 2143 between the centrally located coil and an outside rim of the receiver, but the present disclosure is not limited thereto. In some embodiments, transmitting and receiving coils may be disposed contiguous to the outside rim of the receiver, and an open passageway is provided at the center (or core) part of the trunk sections. By locating transmitting and receiving coils in each trunk sections 210, 220, and 230 on a common axis and providing unobstructed pathways or channels, the magnetic field generated by one coil is able to pass through another coil properly, which enhances the wireless transmission efficiency.

Figure 3B:
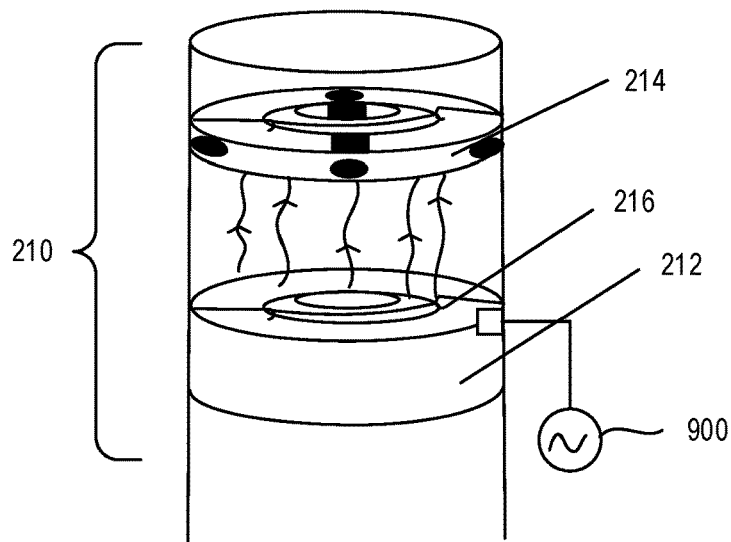
FIG. 3B is a diagram illustrating another trunk portion of an artificial tree according to some embodiments of the present disclosure.

Reference is made to FIG. 3B, which is a diagram illustrating another trunk portion 200 of an artificial tree according to some embodiments of the present disclosure. As shown in FIG. 3B, in some embodiments, the artificial tree 100 is a single pole artificial tree with one trunk section 210. Those of skill in the art will appreciate that the trunk section 210 can be made up of multiple physical pieces that can be assembled by the user. The trunk section 210 includes a single transmitter 212 and a single receiver 214. Accordingly, the transmitter 212 can receive power from the external power source 900, and transmit the power wirelessly to the receiver 214 in the same trunk section 210. Structures and operations of the transmitter 212 and the receiver 214 have been discussed in detail above and thus are not repeated herein for the sake of brevity.

Figure 3C:
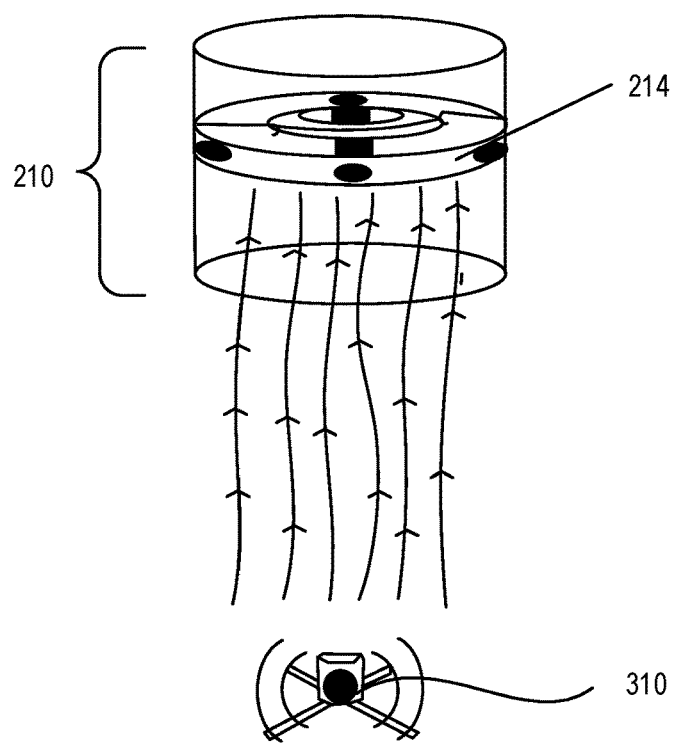
FIG. 3C is a diagram illustrating another trunk portion of an artificial tree according to some embodiments of the present disclosure.

Reference is made to FIG. 3C, which is a diagram illustrating another trunk portion 200 of an artificial tree according to some embodiments of the present disclosure. As shown in FIG. 3C, in some embodiments, the artificial tree 100 is a single pole artificial tree with one trunk section 210. The trunk section 210 only includes a single receiver 214. The receiver 214 is configured to generate an output current in response to an electromagnetic field transmitted to the trunk section 210 from an external power source. In some embodiments, the artificial tree 100 may be powered wirelessly. For example, the receiver 214 can receive wireless power from a generic transmitter 310, which is external from the trunk section 210. In some embodiments, the generic transmitter 310 may be arranged within another part of the artificial tree 100. In some other embodiments, the generic transmitter 310 may be arranged apart from the artificial tree 100 and connected to the external power source 900, and configured to transmit the power wirelessly to the receiver 214 in the trunk section 210. In some other embodiments, lighting elements within the artificial tree 100 may be powered by the output current via internal wired connections coupling the receiver 214 and the lighting elements. Structures and operations of the transmitter 310 and the receiver 214 have been discussed in detail above and thus are not repeated herein for the sake of brevity.

In various embodiments, the distances of the coils, the necessary and allowable signal frequency inside the pole may be designed based on actual needs. In some embodiments, the coil size, including at least the flat single layer coils illustrated in FIG. 2A and FIG. 3A may be determined based on the diameter of the trunk sections 210, 220, and 230. In addition, the pole formed by the trunk sections 210, 220, and 230 may be a hollow metal, aluminum, or polymer pole, which enables energy to be contained and directed within the confines of the metal, aluminum, or polymer tube. The metal, aluminum, or polymer pole may achieve better safety and/or efficiency performance, but the present disclosure is not limited thereto.

Accordingly, by implementing wireless power transmission within a single trunk 210 or between different trunk sections 210, 220, and 230, the physical conductors and/or connectors needed for electrical or data transmission within or around a pole can be eliminated. Therefore, a simplified and smooth mechanical connection for connecting the trunk sections 210, 220, and 230 can be realized for assembling an artificial tree with power supply nodes at both lower portions and upper portions of the tree. Therefore, the installation of the artificial tree can be simplified, and the weight of the artificial tree can be reduced because at least some portions of the wiring can be removed. In addition, the unit costs associated with artificial trees are also reduced.

Figure 4:
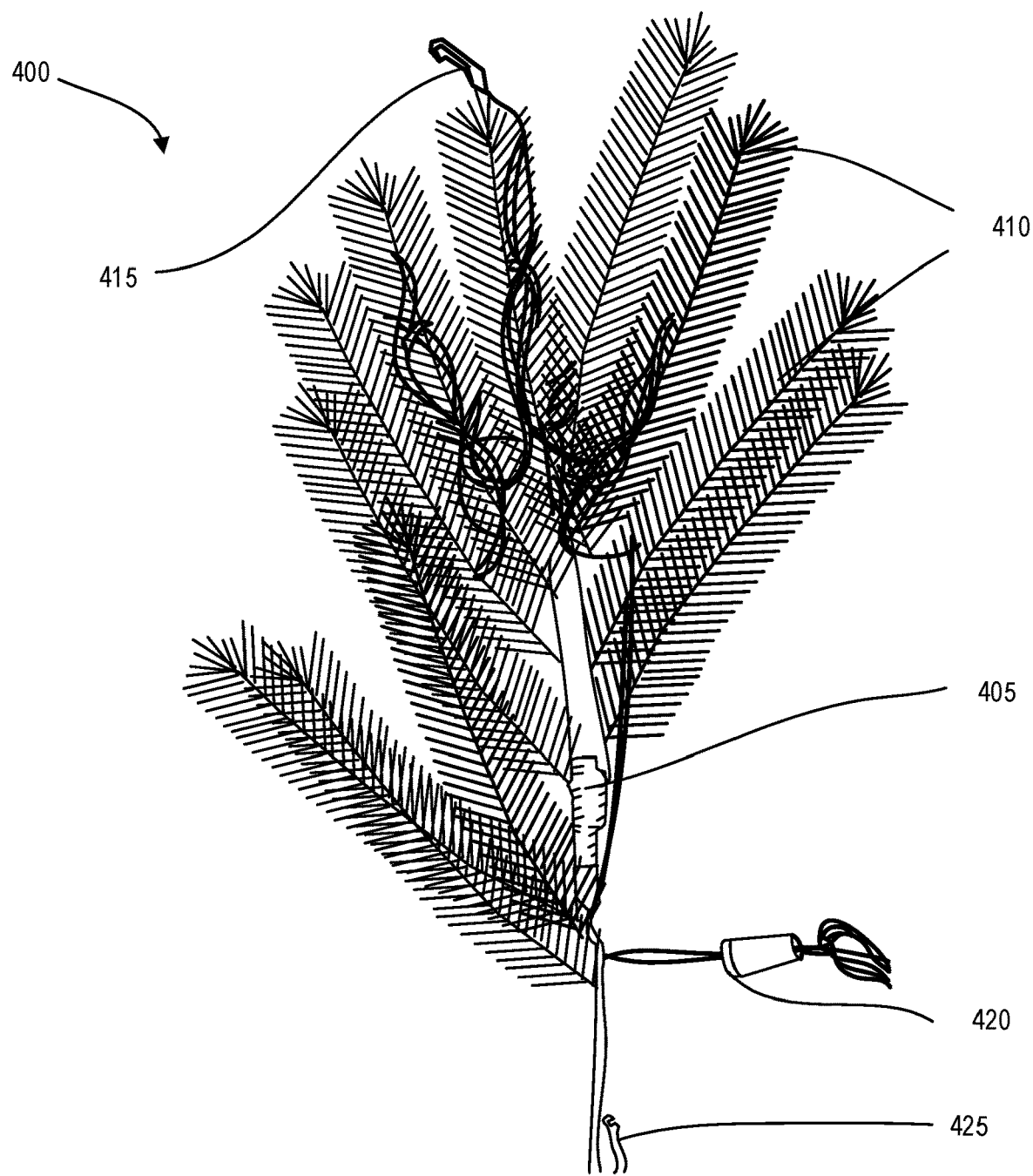
FIG. 4 is a diagram illustrating a branch portion of an artificial tree according to some embodiments of the present disclosure.

Reference is made to FIG. 4, which is a diagram illustrating a branch portion 400 of an artificial tree according to some embodiments of the present disclosure. In some embodiments, the branch portion 400 can be a releasably connected pre-lit branch assembly electrically connected to the artificial tree 100. As depicted, the branch portion 400 can include a main branch 405 and a plurality of attached sub-branches 410. As further depicted, the main branch 405 can include a trunk connector assembly 425. Trunk connector assembly 425 can be configured to attach and detach to the artificial tree 100 and ensure a stable connection when attached. The trunk connector assembly 425, as depicted, is in an unassembled state.

In some embodiments, the branch portion 400 may be electrically connected, via the output connectors located on the receivers, to one of the trunk sections 210, 220, and 230, but the present disclosure is not limited thereto. For example, similar to the wireless power transmission between trunk sections 210, 220, and 230, the branch portion 400 may include one or more receivers for wireless power transmission from trunk sections 210, 220, and/or 230 to the branch portion 400.

The pre-lit branch assembly as well as other releasably connected components discussed here may be releasably connected in several ways. In some embodiments, the mechanical connection is separate and independent from the electrical connection and the mechanical connection and the electrical connection can be connected separately. For example, the mechanical connection can include a removable fastener assembly for connecting and detaching the branch assemblies from the tree pole including a clevis, a clevis pin, and a cotter pin, while the electrical connection includes a plug and receptacle pair or wirelessly connection (or both). In some embodiments, the electrical and mechanical connections are dependent upon each other.

For example, a connector may include both an electrical connector and a mechanical connector (e.g., mechanical pins and receptacles and electrical plugs and receptacles). In other embodiments, the connection may be an electromechanical connection that provides both a mechanical and electrical connection. For example, plug and receptacle pairs may establish electrical and mechanical connection such that the pre lit branch assembly is releasably attached to another component such as a trunk and receives electrical signal from the component. In some embodiments, the electrical connection occurs wirelessly. The wireless electrical connection may be used to transmit data, power, or both.

There may be multiple electrical and/or mechanical connections. For example, a pre-lit branch assembly may receive power from a wireless connection and data from a wired connection or receive power from a wired connection and data from a wireless connection. The wireless electrical connection may occur as a result of the mechanical connection (e.g., the mechanical connection brings the branch assembly in range of a wireless signal to thereby establish a wireless connection).

In some embodiments, the electrical connection may be established indirectly. For example, the branch assemblies are electrically connected to a harness which is electrically connected to the trunk thereby establishing an indirect electrical connection between the branch assemblies and the trunk).

Also, as shown, the branch portion 400 can include a light string 415 and an electrical connector 420 associated with the one of the output connectors of the tree trunk of the artificial tree 100 while ensuring a stable connection when attached. The electrical connectors may be a plug and receptacle pair, sometimes referred to as a lamp lock assembly. As will be appreciated, many connector types can be used for electrically connecting a releasably connected pre-lit branch assembly to a trunk section (e.g., trunk section 210, 220, or 230) of the artificial tree 100. The electrical connectors described herein may carry power, data, or both.

In some embodiments, the branch portion 400 can include a single light string 415 disposed on the branches 405, 410. The single light string 415 can include an electrical connector 420 configured to mate with a connector built into the trunk assembly (e.g., an output connector located on the receiver). In some other examples, the branch portion 400 can include multiple branches having one or more light strings 415 disposed across the branches and at least one of the light strings 415 can include an electrical connector configured to mate with an electrical connector built into the trunk assembly.

In some other examples, the branch portion 400 having the light string 415 with the electrical connector 420 is configured to wirelessly receive power from the trunk assembly power source and distribute the power throughout the light string. Further, instead of the light string 415, in some cases, the branch portion 400 can include a plurality of individual light emitters that are each configured to wirelessly receive power from the wireless power transmitted from the trunk portion 200 of artificial tree 100.

Particularly, the branch portion 400 may also include one or more receivers. Accordingly, the energy required for driving components (e.g., LED lights) installed in the branch portion 400 can be transmit up and across the tree area via the wireless power transmission in the trunk portion 200 to the receiver(s) in the branch portion 400. Similarly, in some embodiments, the branch portion 400 may also include one or more transmitters configured to transmit the wireless power and/or signals to other devices. For example, in some embodiments, the transmitter(s) in the branch portion 400 may be configured to supply power required by one or more ornaments hung on the branch portion 400. As will be appreciated, such embodiments further reduce the need for at least portions of the wirings for the pre-lit branch assembly and the unit costs associated with artificial trees can be further reduced. As will be further appreciated, the incorporation of the wireless power decreases the need for physical connecting and disconnecting of lighting during both manufacturing and maintenance of artificial trees.

Figure 5:
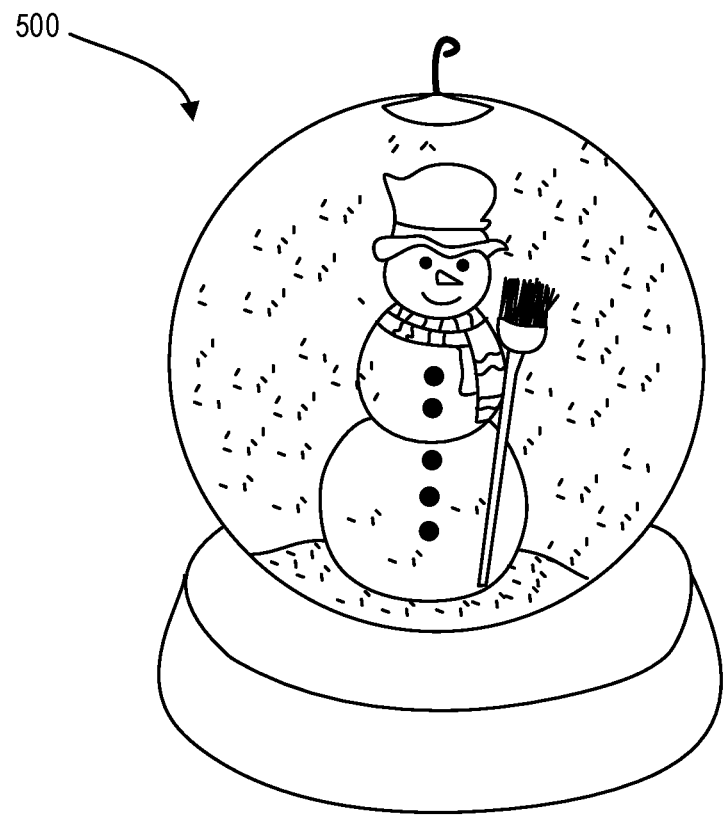
FIG. 5 is a diagram illustrating an ornament for the artificial tree, according to some embodiments of the present disclosure.

Reference is made to FIG. 5, which is a diagram illustrating an ornament 500 for the artificial tree 100, according to some embodiments of the present disclosure. As shown in FIG. 5, the ornament 500 may be a snow globe to be hung on the artificial tree 100 (or displayed in various ways). In some embodiments, a control unit, a lighting module and/or a motion module, can be integrated in the ornament 500. For example, the control unit can be electrically connected to one or more LED components and a micro electric motor, and configured to output driving signals to drive the LED component(s) and the micro electric motor, in order to create an illuminated and/or blustering snow scene within the ornament 500. The ornament 500, including the circuits and electrical components within the ornament 500, can be powered wirelessly and displayed when hung on the artificial tree.

It would be appreciated that while in FIG. 5, the ornament 500 is in the form of a snow globe, the present disclosure is not limited thereto. For example, in some embodiments, the ornament 500 can be a LED light source, or other decorative items (e.g., candy canes) configured to be illuminated internally with LED lighting component(s) arranged in the ornament 500 and powered wirelessly by the receiver(s) integrated in the ornament 500. For example, various lighting patterns can be applied the decorative candy canes, such as alternating red and white stripes, or motion can be caused, but the present disclosure is not limited thereto. The red and white stripes of the decorative candy canes may be created by diagonal rows of alternating red and white LED units respectively. Accordingly, the power can be wirelessly transferred from the trunk portion 200 and/or the branch portion 400 to the LED light sources, the decorative candy canes, or other decorative items hung on the artificial tree by corresponding transmitter(s) and receiver(s) to supply the electricity for illuminating the ornament 500, projecting light or images, or causing motion to occur as part of the ornamental display.

In some other embodiments, the ornament 500 may be a tree topper, such as a star or angel. Similarly, the tree topper can be illuminated, wirelessly, with various programmed lighting effects, such as a flickering or sparkling light effect, or a color changing lighting effect, or may levitate. For example, a star tree topper may be configured to glow or pulse like a real star by programed LEDs, alternating between different brightness level. For example, the star tree topper may be switched gradually between a dimmer light and a brighter light repeatedly.

In some other embodiments, the ornament 500 is in the form of one or more decorative candles made to look like old-fashioned wax candle(s) that were the original lighting for the Christmas trees. Similarly, the ornament 500 includes one or more LED units configured to mimic the flickering of a real candle flame and is powered wirelessly by the receiver(s) integrated within the ornament 500. For example, the LED flickering flame can be created by a series of programed LEDs, providing a flickering light effect. It would be appreciated that, in some other embodiments, the ornament 500 may be other ornaments in forms or shapes commonly used as ornaments for display on decorative trees for one skilled in the art, or may be an imbedded light source in the foliage or branches of the artificial tree 100.

As described above, the receivers or transceivers can be arranged and integrated in lighting units, such as LED sources, various objects or ornaments, or embedded within the stem of a branch portion of the artificial tree 100. In some embodiments, the receivers or transceivers in the artificial tree 100 may also be configured to receive wireless signals from other transmitters that are not part of the artificial tree 100. For example, the receivers or transceivers integrated in the ornaments may also receive signals from a power supplying device located in or around a dwelling for transmitting energy and/or data wirelessly within a given area or region. In some alternative embodiments, the receiver (e.g., receivers 214, 224, or 234) installed in one or more trunk sections 210, 220 or 230 of the trunk portion 200 may also be configured to receive an electromagnetic field transmitted to the trunk section from an external wireless power source that is not part of the artificial tree 100, and configured to generate the output current in response to the received electromagnetic field signals. Accordingly, the lighting module coupled to the trunk can receive the output current from the receiver, so that one or more LED components in the lighting module can be powered by the output current.

In some other embodiments, the artificial tree 100 may also be used as a base or hub station for interacting with other units or devices and providing energy and/or data wirelessly to the units or devices around the artificial tree 100. For example, the artificial tree 100 may be physically connected to the power source via wires and configured to provide energy and/or interact with other decoration items, such as wreaths/garlands, mini-trees/secondary trees, tree toppers, a Christmas train set, a nativity scene (also known as a manger scene, crib, crèche), a monitor or a display, a speaker, an aroma device, a smoke emitting device (for Halloween trees), or the like. In some embodiments, additional battery device(s) can be arranged external to the pole of the artificial tree 100 and located within a hub system located outside of the pole but near to the tree. The battery device(s) can be configured to receive and store energy from wireless source(s) located inside the house (or other building), and then to supply the power required by the artificial tree 100.

The embodiments may further be described using the following clauses:

1. An artificial tree comprising:
   a trunk comprising one or more trunk sections, the one or more trunk sections comprising:
      a first trunk section comprising:
         a first transmitter connected to a power source and configured to convert an input power received from the power source into an electromagnetic field; and
         a first receiver arranged proximate the first transmitter and configured to receive the electromagnetic field generated by the first transmitter and generate a first output current.
2. The artificial tree of clause 1, further comprising:
   a second trunk section mechanically connected to the first trunk section, the second trunk section comprising:
      a second receiver configured to generate a second output current in response to the electromagnetic field transmitted between the first trunk section and the second trunk section.
3. The artificial tree of clause 1, further comprising: one or more branch portions comprising one or more loads, wherein each of the one or more branch portions is connected to one of the one or more trunk sections, and the one or more loads are powered by one or more corresponding output currents from the one or more trunk sections.

4. The artificial tree of clause 1, further comprising: a lighting module configured to receive the first output current.

5. The artificial tree of clause 1, wherein the one or more trunk sections further comprise:
 a second trunk section mechanically connected to the first trunk section, the second trunk section comprising:
  a second receiver configured to generate a second output current in response to the electromagnetic field transmitted between the first trunk section and the second trunk section; and
 a third trunk section mechanically connected to the second trunk section, the third trunk section comprising:
  a third receiver configured to generate a third output current in response to the electromagnetic field transmitted from the first trunk section, via the second trunk section, to the third trunk section.

6. The artificial tree of clause 5, wherein the second trunk section further comprises:
 one or more battery components coupled to the second receiver and configured to be charged using the second output current; and
 a second transmitter configured to convert power stored in the one or more battery components into the electromagnetic field.

7. The artificial tree of clause 6, wherein the second trunk section further comprises:
 a rectifier configured to rectify an induced alternating current, generated in response to the electromagnetic field, to output the second output current.

8. The artificial tree of clause 5, wherein the second trunk section further comprises:
 one or more intermediate resonators configured to enhance a transfer distance of wireless power transmitted within the second trunk section.

9. The artificial tree of clause 1, further comprising:
 an ornament comprising:
  a receiver configured to generate an output current in response to the electromagnetic field generated by the first transmitter;
  a lighting module comprising one or more LED components powered by the output current; and
  a control unit electrically connected to the one or more LED components and configured to output one or more driving signal to drive the one or more LED components.

10. The artificial tree of clause 9, wherein the ornament is a LED light source, a snow globe, a tree topper, a decorative LED candle, a projector, a levitating object, a decorative candy cane, an imbedded light source in foliage or branches of the artificial tree, or any combination thereof.

11. The artificial tree of clause 1, wherein the first receiver comprises one or more openings, passageways, or channels for transmission of the electromagnetic field within the trunk.

12. The artificial tree of clause 1, wherein the first transmitter comprises one or more transmitting coils, and the first receiver comprises one or more receiving coils associated with the one or more transmitting coils.

13. The artificial tree of clause 12, wherein the one or more transmitting coils and the one or more receiving coils are flat spiral coils.

14. The artificial tree of clause 12, wherein the first transmitter and the first receiver communicate wirelessly through inductive coupling via induced magnetic fields between the one or more transmitting coils and the one or more receiving coils.

15. The artificial tree of clause 12, wherein the one or more transmitting coils and the one or more receiving coils are disposed at a core part of the one or more trunk sections, with openings between the core part and an outside rim of a corresponding receiver.

16. The artificial tree of clause 12, wherein the one or more transmitting coils and the one or more receiving coils are disposed contiguous to an outside rim of a corresponding receiver.

17. The artificial tree of clause 16, wherein an open passageway is provided in the core of the one or more trunk sections.

18. The artificial tree of clause 1, wherein the first receiver comprises one or more output connectors configured to be connected to one or more loads of one or more branch portions.

19. The artificial tree of clause 18, wherein the one or more trunk sections are drilled and include one or more holes for mounting the one or more output connectors.

20. An artificial tree comprising:
 a trunk comprising one or more trunk sections, the one or more trunk sections comprising:
  a receiver configured to generate an output current in response to an electromagnetic field transmitted to a corresponding trunk section from an external power source; and a lighting module coupled to the trunk, the lighting module comprising one or more LED components powered by the output current.

21. An artificial tree comprising:
 a trunk comprising one or more trunk sections, the one or more trunk sections comprising:
  a receiver configured to generate an output current in response to an electromagnetic field transmitted to a corresponding trunk section from an external power source.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. An artificial tree comprising:
 a trunk comprising one or more trunk sections forming a pole configured to support one or more branch portions, the one or more trunk sections comprising:
 a first trunk section comprising:
 a first transmitter connected to a power source and configured to convert an input power received from the power source into an electromagnetic field; and
 a first receiver arranged proximate the first transmitter and configured to receive the electromagnetic field generated by the first transmitter and generate a first output current;

a second trunk section mechanically connected to the first trunk section, the second trunk section comprising:
a second receiver configured to generate a second output current in response to the electromagnetic field transmitted between the first trunk section and the second trunk section.

2. The artificial tree of claim 1, further comprising:
a second trunk section mechanically connected to the first trunk section, the second trunk section comprising:
a second receiver configured to generate a second output current in response to the electromagnetic field transmitted between the first trunk section and the second trunk section.

3. The artificial tree of claim 1, further comprising: one or more branch portions comprising one or more loads, wherein each of the one or more branch portions is connected to one of the one or more trunk sections, and the one or more loads are powered by one or more corresponding output currents from the one or more trunk sections.

4. The artificial tree of claim 1, further comprising: a lighting module configured to receive the first output current.

5. The artificial tree of claim 1, wherein the one or more trunk sections further comprise:
a third trunk section mechanically connected to the second trunk section, the third trunk section comprising:
a third receiver configured to generate a third output current in response to the electromagnetic field transmitted from the first trunk section, via the second trunk section, to the third trunk section.

6. The artificial tree of claim 5, wherein the second trunk section further comprises:
one or more battery components coupled to the second receiver and configured to be charged using the second output current; and
a second transmitter configured to convert power stored in the one or more battery components into the electromagnetic field.

7. The artificial tree of claim 6, wherein the second trunk section further comprises:
a rectifier configured to rectify an induced alternating current, generated in response to the electromagnetic field, to output the second output current.

8. The artificial tree of claim 5, wherein the second trunk section further comprises:
one or more intermediate resonators configured to enhance a transfer distance of wireless power transmitted within the second trunk section.

9. The artificial tree of claim 1, further comprising:
an ornament comprising:
a receiver configured to generate an output current in response to the electromagnetic field generated by the first transmitter;
a lighting module comprising one or more LED components powered by the output current; and
a control unit electrically connected to the one or more LED components and configured to output one or more driving signal to drive the one or more LED components.

10. The artificial tree of claim 9, wherein the ornament is a LED light source, a snow globe, a tree topper, a decorative LED candle, a projector, a levitating object, a decorative candy cane, an imbedded light source in foliage or branches of the artificial tree, or any combination thereof.

11. The artificial tree of claim 1, wherein the first receiver comprises one or more openings, passageways, or channels for transmission of the electromagnetic field within the trunk.

12. The artificial tree of claim 1, wherein the first transmitter comprises one or more transmitting coils, and the first receiver comprises one or more receiving coils associated with the one or more transmitting coils.

13. The artificial tree of claim 12, wherein the one or more transmitting coils and the one or more receiving coils are flat spiral coils.

14. The artificial tree of claim 12, wherein the first transmitter and the first receiver communicate wirelessly through inductive coupling via induced magnetic fields between the one or more transmitting coils and the one or more receiving coils.

15. The artificial tree of claim 12, wherein the one or more transmitting coils and the one or more receiving coils are disposed at a core part of the one or more trunk sections, with openings between the core part and an outside rim of a corresponding receiver.

16. The artificial tree of claim 12, wherein the one or more transmitting coils and the one or more receiving coils are disposed contiguous to an outside rim of a corresponding receiver.

17. The artificial tree of claim 16, wherein an open passageway is provided in the core of the one or more trunk sections.

18. The artificial tree of claim 1, wherein the first receiver comprises one or more output connectors configured to be connected to one or more loads of one or more branch portions.

19. The artificial tree of claim 18, wherein the one or more trunk sections are drilled and include one or more holes for mounting the one or more output connectors.

20. An artificial tree comprising:
a trunk comprising one or more trunk sections, the one or more trunk sections comprising:
a transmitter connected to a power source and configured to convert an input power received from the power source into an electromagnetic field; and
a receiver configured to generate an output current in response to receiving the electromagnetic field generated by the transmitter an electromagnetic field transmitted to a corresponding trunk section from an external power source, wherein the receiver comprises one or more openings, passageways, or channels for transmission of the electromagnetic field within the trunk.

21. An artificial tree comprising:
a trunk comprising one or more trunk sections, the one or more trunk sections comprising:
a transmitter connected to a power source and configured to convert an input power received from the power source into an electromagnetic field; and
a receiver configured to generate an output current in response to receiving the electromagnetic field generated by the transmitter,
wherein the transmitter comprises one or more transmitting coils, and the first receiver comprises one or more receiving coils associated with the one or more transmitting coils.

* * * * *